United States Patent Office 3,366,384
Patented Jan. 30, 1968

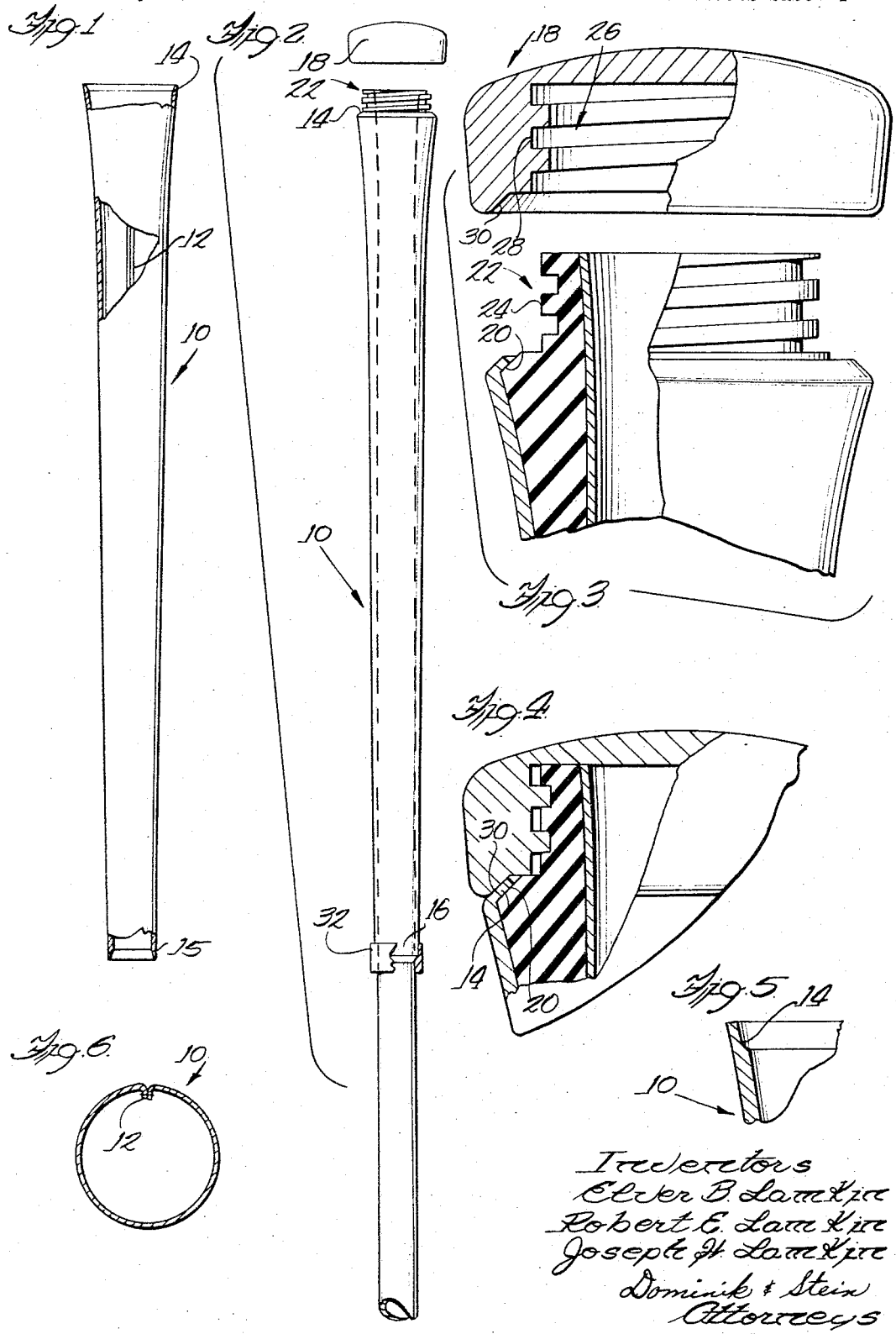

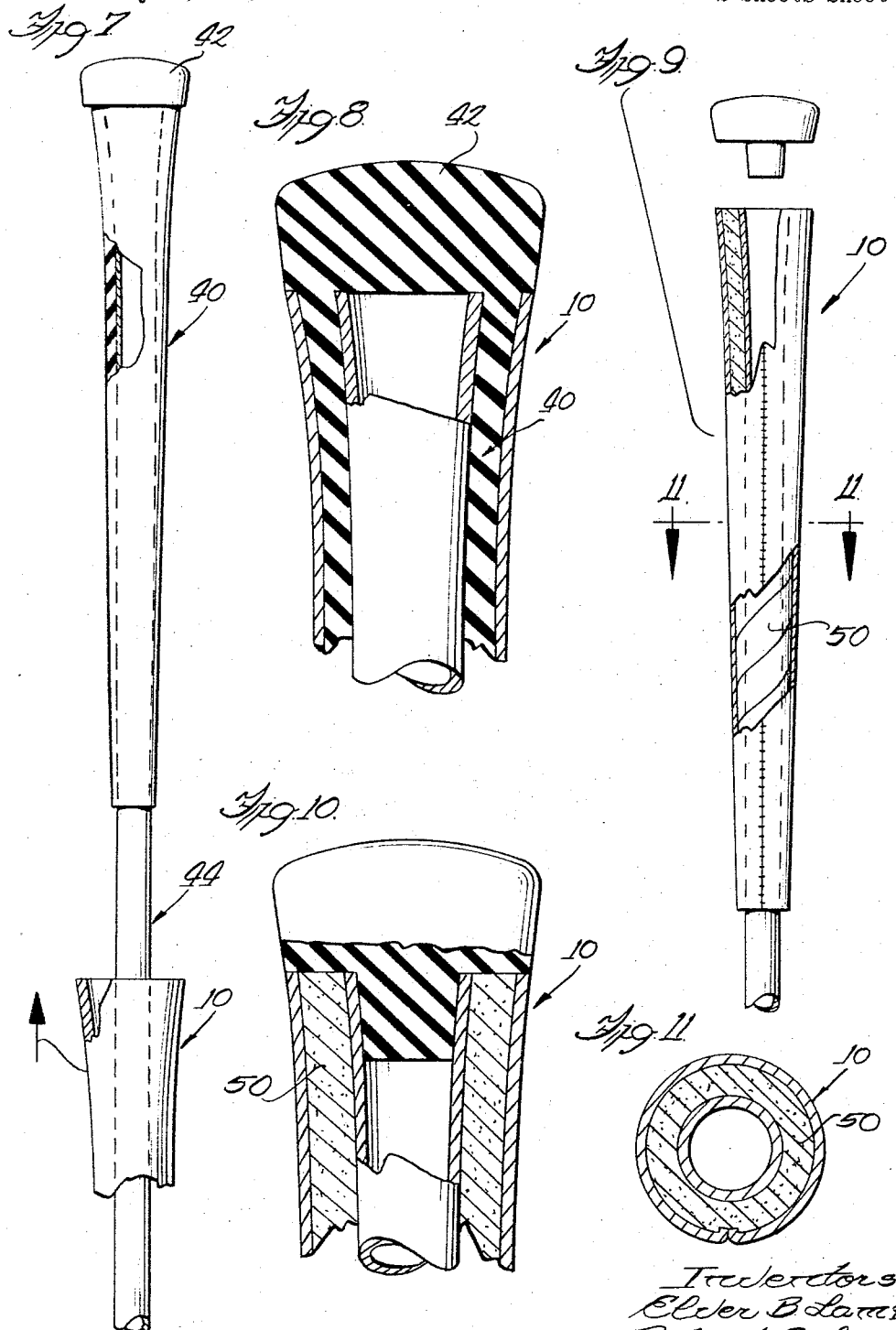

3,366,384
GOLF CLUB GRIP AND METHOD FOR
MAKING SAME
Elver B. Lamkin, Chicago, Robert E. Lamkin, Downers Grove, and Joseph H. Lamkin, Chicago, Ill., assignors to Lamkin Leather Company, Inc., Chicago, Ill., a corporation of Illinois
Filed July 30, 1965, Ser. No. 476,029
8 Claims. (Cl. 273—81)

This invention relates in general to hand grips for golf clubs and in particular to hand grips for golf clubs which are fabricated of leather and which are separately formed so that they may be supplied to golf club makers, users, and repairers for application to the ends of golf club shafts or handles.

Hand grips for golf clubs are generally either of molded rubber or a similar material which is molded directly to the end of the golf club shaft, hereinafter generally referred to as molded hand grips, or of leather generally in the form of a leather strip which is wrapped spirally about the golf club shaft. An example of the former is the hand grip disclosed in U.S. Patent 2,468,202, issued Apr. 26, 1949, to James A. Karns, while an example of the latter is the hand grip disclosed in U.S. Patent 3,087,729, issued Apr. 30, 1963, to Arthur M. Sullivan. Each of these types of hand grips offer certain advantages, and are therefore preferred by the individuals who use them, for those reasons. In fact, hand grips of leather and of molded rubber are considered by professional golfers and by the manufacturers as two separate and distinct classes of hand grips, and cannot be really compared, one to another.

As far as a manufacturer of hand grips is concerned, the professional golfer may prefer a hand grip of leather or of molded rubber and, in either case, the monetary return which can be derived through advertising that a particular professional golfer uses a manufacturer's hand grip may be substantial. The primary market is directed to the amateur golfer and even though he may be swayed by such advertising to purchase golf clubs having a leather or molded hand grip, he is usually cost conscious. If there is a substantial difference in price, he will in many cases purchase the cheaper of the two hand grips.

Molded hand grips have the advantage that they can generally be fabricated at a relatively cheaper cost than the presently available leather hand grips. This is partially due to the fact that the leather hand grips are spirally wrapped about the golf club shaft, or an underlisting, by a hand operation. The molded hand grips are, on the other hand, molded directly onto the golf club shaft, by a machine operation. The labor cost in fabricating the latter type of hand grip is therefore substantially reduced.

Hand grips formed of a leather strip spirally wrapped about the golf club shaft are subject to unwrapping after an extended period of time, depending upon the frequency of use of the golf clubs. A molded hand grip, of course, will not unwrap. Another factor in favor of the molded hand grips is that they provide an unrestricted area for imprinting the manufacturer's name, a design, or other advertising material on them. Spirally wrapped leather grips are limited by the resulting creases between adjacent wraps.

It would be particularly advantageous to have a leather hand grip which provides the above mentioned advantages previously provided by only molded hand grips and which can be easily and quickly fixed to a golf club shaft. Accordingly, it is an object of the present invention to provide improved leather hand grips for golf clubs which overcomes the above mentioned disadvantages of prior leather hand grips.

It is another object of the present invention to provide improved leather hand grips for golf clubs which provide advantages in applying them to golf club shafts that were not heretofore provided by presently available hand grips.

It is still another object of the present invention to provide leather hand grips for golf clubs which can be applied to golf club shafts, by prefitting them on an underlisting or by fitting them onto an underlisting after it is affixed to the shaft. In this respect, it is further contemplated that the leather hand grip can be used with rubber underlisting or the like having either an open or a closed end, and also with cardboard underlisting or the like.

It is still another object of the present invention to provide leather hand grips for golf clubs which can be easily replaced on the golf club shaft by repairers, such as the professional in the pro shop.

It is still another object of the present invention to provide a leather hand grip for golf clubs which allows a manufacturer to place a grip trim on the end of the grip, without having to trim or skive the end of the leather grip as in the past.

It is still another object of the present invention to provide a leather hand grip which provides an unrestricted area for design.

It is still another object of the present invention to provide a leather hand grip which allows a greater tolerance to compensate for the gauge size of the golf club shaft.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

The above objectives are accomplished with the leather hand grip of the present invention which is in the form of a sleeve which is formed from a single piece of leather having its side edges skived so that when the edges are sewn together to form a seam, a smooth rather than a rough, upstanding seam is provided. Also, in accordance with one embodiment of the invention, the top edge of the sleeve is skived so that when assembled onto a rubber underlisting, the top skived edge thereof overlaps a beveled edge formed on the top of the underlisting and is fixedly retained by a cap placed on its end. The sleeve is also preferably formed so that it overlaps, or extends beyond, the lower end of the underlisting and, when so formed, a grip trim may be placed on the end of the leather hand grip, without having to trim or skive the end of the leather grip. As will be explained fully hereinafter, the leather hand grip of the present invention may be prefitted on an underlisting having either an open or a closed end prior to assembling them onto a golf club shaft, or the underlisting can be affixed to the golf club shaft and the leather sleeve subsequently affixed thereto.

For a fuller understanding of the nature and objects of the invention, reference should be had to the following detailed description taken in connection with the accompanying drawings, in which:

FIGURE 1 is a plan view of a leather hand grip exemplary of the present invention, partially sectionalized to illustrate the skiving at its opposite ends, and the seam formed so that the edges thereof are on the interior of the grip;

FIGURE 2 is a plan view of the leather hand grip of FIG. 1, affixed to an underlisting having a threaded open end which is closed by means of an end cap, and also illustrating the manner in which a grip trim is affixed to the hand grip;

FIGURES 3 and 4 are enlarged, partially sectioned, views of the end of the golf club shaft of FIG. 2, illustrating the manner in which the end of the leather hand grip fixedly retained by the end cap when the latter is affixed to the end of the underlisting;

FIGURE 5 is a partial view of the end of the leather hand grip of FIG. 1 sectioned to illustrate the skiving at its end;

FIGURE 6 is an enlarged sectional view taken transversely to the leather hand grip of FIG. 1, illustrating the seam formed interiorly thereof;

FIGURE 7 is a plan view illustrating one manner in which the leather hand grip of FIG. 1 can be affixed to an underlisting having a closed end, after the underlisting is affixed to the end of a golf club shaft;

FIGURE 8 is an enlarged sectional view of the end of the golf club of FIG. 7, illustrating the underlisting with the leather hand grip affixed thereto;

FIGURE 9 is a view illustrating the leather hand grip of FIG. 1 affixed to a golf club shaft having a cardboard underlisting;

FIGURE 10 is an enlarged sectional view of the end of the golf club shaft of FIG. 9, when assembled; and FIGURE 11 is a sectional view, taken along lines 11—11 of FIG. 9.

Similar reference characters refer to similar parts throughout the several views of the drawings.

Referring now to FIG. 1 which shows a leather hand grip 10 exemplary of the present invention, it can be noted that the leather hand grip 10 is formed in the shape of a sleeve which is tapered to correspond to the contour of the end of a golf club shaft. The leather hand grip 10 is formed a single piece of leather which is skived along the length of its side edges and these edges are brought together in face to face relationship, with the sleeve inside out from its ultimate configuration, and the side edges sewn to one another to form a seam 12. As can be best seen in FIG. 6, the skived edges provide a smooth seam when the sleeve is turned right side out, since the sewn portion of the seam projects towards the interior of the leather hand grip. The top edge 14 and the bottom edge 15 of the sleeve are also skived about its interior periphery, prior to the leather hand grip being sewn into its sleeve configuration, for reasons to be explained.

In FIG. 2, the leather hand grip 10 is shown affixed to an underlisting 16, to form a golf club grip. The underlisting 16 may be fabricated of any moldable material, however, it is preferably of soft rubber material, and is in the form of a tapered, open ended tube or sleeve. The grip is terminated at the but end of the club by means of a cap 18. The underlisting 16 has a beveled edge 20, which can be best seen in FIGS. 3 and 4, and it will be observed from these figures that the skived top end 14 of the leather hand grip 10 will overlap the beveled edge 20 when the hand grip is affixed to the underlisting 16.

The underlisting 16 has a reduced diameter portion 22 having external threads 24 formed thereon, and the cap 18 has threaded cavity 26 formed therein, the threads 28 of which are adapted for engagement with the threads 24 formed on the reduced diameter section 22 of the underlisting 16. The underside of the cap 18 is also undercut so as to provide a conical peripheral surface 30 which is adapted to matingly engage the beveled edge 20 formed on the underlisting 16. As can be best seen in FIG. 4, the skived edge 14 of the leather hand grip 10 which overlaps the beveled edge 20 of the underlisting 16 is pressed and securely retained the beveled edge 20 and the conical peripheral surface 30, when the cap 18 is threaded onto the underlisting 16. The skived top edge 14 of the leather hand grip 10, the conical peripheral surface 30 of the cap 18 and the beveled edge 20 of the underlisting 16 therefore provide an effective means for terminating, or securing, the end of the leather hand grip 10, and hence it is unnecessary to secure the end, by means of an adhesive or the like, as in the past.

The leather and grip 10 is preferably longer in length than the underlisting 16 so that its skived bottom edge 15 overlaps the end of the underlisting 16, as shown in FIG. 2. With this arrangement, it is found that a grip trim 32 of the type generally used to terminate the end of a golf club grip can be secured to the leather hand grip 10 by wedging the grip trim over the end of the leather hand grip, without having to trim and to skive its end, as in the past. The necessary skiving and trimming is performed by a machine operation during the fabrication of the leather hand grip 10, hence substantial savings in time, and therefore labor costs, is provided. If desired, an adhesive can be applied to the end of the leather hand grip 10, before the grip trim 32 is wedged on to it to more securely retain it in a fixed position.

In FIG. 7 there is shown an underlisting 40 which may be fabricated of soft rubber material, cardboard or the like and which has an enlarged cap portion 42 formed as an integral part thereof so as to close its end. FIG. 7 also illustrates one of the numerous advantages provided by the leather hand grip 10 of the present invention. As illustrated, the underlisting 40 can be preassembled onto the end of a golf club shaft 44 and the leather hand grip 10 can thereafter be slipped over the club end of the shaft, prior to affixing the club head to it, and slipped up over the underlisting 40. It is apparent that the leather hand grip 10 can be easily and quickly affixed to the underlisting 40. As previously indicated, with leather hand grips of the type disclosed in the above mentioned Sullivan patent, the leather hand grip had to be spirally wound, by hand, upon the underlisting 40, prior to affixing the same to the end of golf club shaft, or the leather hand grip has to be spirally wound upon the underlisting after it had been affixed to the golf club shaft, as shown in FIG. 7. In either case, spirally winding the leather hand grip upon the underlisting constituted a substantial portion of the cost of providing a leather golf club grip.

It is of course obvious that the underlisting 16 of FIG. 2 can be affixed to the end of a golf club shaft and the leather hand grip 10 thereafter slipped over it, in the manner illustrated in FIG. 7. It is also obvious that the leather hand grip 10 can be preassembled upon the underlistings 16 and 40 prior to the time they are affixed to the end of a golf club shaft. In such a case, the grip comprising the underlisting 16, or 40, and the leather hand grip 10 may be slipped onto the shaft by means of a starter in the form of an expander inserted within the underlisting, to provide a gradually increasing diameter for the underlisting and to cover the sharp edge of the shaft. The starter is removed after the grip is in place.

In FIG. 9 the leather hand grip 10 is illustrated affixed to a cardboard underlisting 50. A cardboard underlisting of this type is used by a large number of manufacturers of golf clubs, on their lower price line. The manufacturers normally form the cardboard underlisting directly onto the end of a golf club shaft by spirally wrapping a suitable paper material about the end of a golf club shaft to obtain the desired uniform taper and thickness for the underlisting. If the manufacturer provides a leather hand grip over the cardboard underlisting, prior to the present invention he was limited to spirally wrapping a leather hand grip over it. This generally defeated his purpose since spirally wrapping a leather hand grip about the cardboard underlisting substantially increased his cost so that even using a cardboard underlisting resulted in a cost comparable to the more expensive lines of his competitors. It can be seen that the leather hand grip 10 of the present invention can be easily applied to the cardboard underlisting, in the manner illustrated in FIG. 7. A manufacturer can now therefore apply a cardboard underlisting to the end of a golf club shaft and apply a leather hand grip thereto merely by sliding the leather hand grip up over the cardboard underlisting from the club head end of the golf club.

The leather hand grip 10 can be applied to an underlisting in several different manners. An adhesive can be applied to the underlisting prior to applying the leather hand grip to it, and allowed to dry. A large number of pre-glued underlistings can therefore be prepared in advance, for use when needed. The leather hand grip 10 is prepared for application to the underlisting, by running a swab through it which has been dipped into a solvent of any suitable type for reactivating the adhesive. This is easily and speedily accomplished since the swab need be only run through the sleeve. In the past, this operation was far more time consuming since the underlisting had to be rotated and the solvent applied to it. After running the swab through the sleeve, it is merely slipped over the underlisting to its proper position. The solvent activates the adhesive and renders the surface of the underlisting slippery so that the sleeve can be easily slipped onto the underlisting. The underlisting with the leather hand grip 10 thereon can thereafter be applied to the end of a golf club shaft, by using an expander, in the manner described above.

Another method is to apply adhesive to the end of a golf club shaft and to then affix the underlisting on to it. Adhesive is applied to the underlisting and, prior to the time the club head is affixed to the golf club shaft, the leather hand grip 10 is slipped over the club head end of the shaft and over the underlisting. The adhesive provides a slippery surface on the underlisting to assist in sliding the sleeve onto the underlisting. If the adhesive on the underlisting is allowed to dry prior to applying the leather hand grip to it, a swab dipped in an appropriate solvent is run through it, as described above.

As indicated above, manufacturers generally use a cardboard underlisting on their cheaper line of golf clubs and, in the past, they were restricted to applying a leather grip to it, by spirally wrapping a leather strip about the cardboard underlisting. With the leather grip of the present invention, the cardboard underlisting can be applied directly to the golf club shaft, as in the past, and substantial time is saved since the leather grip can be applied by slipping it over the club head end of the shaft, in the manner described above.

The leather grip of the present invention can also be applied to a cardboard underlisting in the form of a preformed tube, before the latter is affixed to a golf club shaft.

Repairers such as the professional in a pro shop can also easily and quickly replace the hand grip on a golf club with the leather hand grip of the present invention. The old hand grip is removed and the leather hand grip applied to an underlisting, in the manner described above, and the underlisting with the leather hand grip thereon affixed to the golf club shaft, using an expander. The leather hand grip can also be slipped over the end of the golf club shaft, using an expander, prior to affixing it to an underlisting, the underlisting affixed to the shaft and the leather hand grip slipped up over it.

The leather hand grip of the present invention being in the form of a sleeve and having only a single seam with inwardly projecting ends provides virtually an unrestricted area for the manufacturer to place his name, or a design. In the past, the available leather hand grips were severely restricted in this respect.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A leather hand grip for a golf club comprising a single piece of leather which has a bevel along two of its edges and which is formed in a tubular shape by threads uniting said two edges together, said two edges projecting inwardly toward the interior of said leather hand grip.

2. A leather hand grip for a golf club comprising a single piece of leather which has a bevel along two of its edges and which is formed in a tubular shape by threads uniting said two edges together, said two edges projecting inwardly toward the interior of said leather hand grip, said single piece of leather also being beveled along another one of its edges so as to provide a surface which cooperates to retain a grip trim applied to said leather hand grip.

3. A leather hand grip for a golf club comprising a single piece of leather which has a bevel along its edges and which is formed in an elongated tapered tubular shape by threads uniting two of said edges together, said two edges projecting inwardly toward the interior of said leather hand grip.

4. A leather hand grip for a golf club comprising, in combination: an underlisting having a tubular shape and a leather gripping surface thereon, said leather gripping surface comprising a single piece of leather which has a bevel along two of its edges and which is formed in a tubular shape by threads uniting said two edges together, said two edges projecting inwardly toward the interior of said leather hand grip.

5. A method for applying a leather golf club grip to a golf club shaft comprising the steps of affixing an underlisting to the grip end of said golf club shaft, forming a leather gripping surface for said underlisting by skiving a single piece of leather to form a bevel along two of its edges and forming said piece of leather into a tubular shape by sewing said two skived edges together, said edges projecting inwardly toward the interior thereof, and applying said leather gripping surface to said underlisting by slipping it over the club head end of said shaft and onto said underlisting prior to affixing the club head to said shaft.

6. A method for applying a leather golf club grip to a golf club shaft comprising the steps of forming a leather gripping surface by skiving a single piece of leather to form a bevel along two of its edges and forming said piece of leather into a tubular shape by sewing said two edges together, said edges projecting inwardly toward the interior thereof, applying said leather gripping surface to an underlisting by slipping it over one end of said underlisting, and affixing said underlisting with said leather gripping surface thereon to said golf club shaft.

7. A leather hand grip for a golf club comprising, in combination: an underlisting having a tubular shape body portion substantially corresponding to the contour of an end of said golf club and a closed end thereon, and a leather gripping surface on said body portion formed of a single piece of leather which has a bevel along two of its edges and which is formed in a tubular shape by threads uniting said two edges together, said two edges projecting inwardly toward the interior of said leather hand grip.

8. The leather hand grip of claim 7 wherein the closed end on said body portion is integrally formed therewith and has a larger diameter than said portion so as to form an abutment surface, the end of said leather gripping surface being abutted against said abutment surface, said diameter of said closed end being such that a substantially smooth continuous joint between said leather gripping surface and said closed end is provided.

References Cited

UNITED STATES PATENTS

| | | | |
|---|---|---|---|
| 1,345,505 | 7/1920 | Persons | 273—165 |
| 2,091,455 | 8/1937 | Riddell | 273—65 |
| 2,221,421 | 11/1940 | Curry | 273—81 |

ANTON O. OECHSLE, *Primary Examiner.*

R. J. APLEY, *Assistant Examiner.*